United States Patent [19]

Kine

[11] 4,223,563
[45] Sep. 23, 1980

[54] MECHANISM FOR MOUNTING A SPEED CONTROL LEVER TO A BICYCLE

[75] Inventor: Masayoshi Kine, Osaka, Japan

[73] Assignee: Shimano Industrial Company, Limited, Osaka, Japan

[21] Appl. No.: 969,146

[22] Filed: Dec. 13, 1978

[30] Foreign Application Priority Data

Dec. 28, 1977 [JP] Japan .................................. 52-177333

[51] Int. Cl.² ........................ G05G 5/18; B62K 23/06
[52] U.S. Cl. ............................. 74/501 R; 74/473 R; 74/487; 74/489; 280/280; 280/289 R
[58] Field of Search ........... 280/236, 279, 280, 289 R; 74/487, 489, 501 R, 501.5 R, 494, 217 B, 473 R

[56] References Cited

U.S. PATENT DOCUMENTS

| | | | |
|---|---|---|---|
| 3,426,614 | 2/1969 | Brilando | 74/501 R |
| 3,831,979 | 8/1974 | Baginski | 280/279 |
| 3,915,029 | 10/1975 | Shimada | 74/501 R |

*Primary Examiner*—John J. Love
*Assistant Examiner*—Randall A. Schrecengost
*Attorney, Agent, or Firm*—Stevens, Davis, Miller & Mosher

[57] ABSTRACT

A mechanism for mounting a speed control lever to a bicycle is so constructed that a bearing member, which is fixed to an upper end of a head pipe of the bicycle, is extended axially upwardly to form an extension which rotatably supports the speed control lever.

7 Claims, 6 Drawing Figures

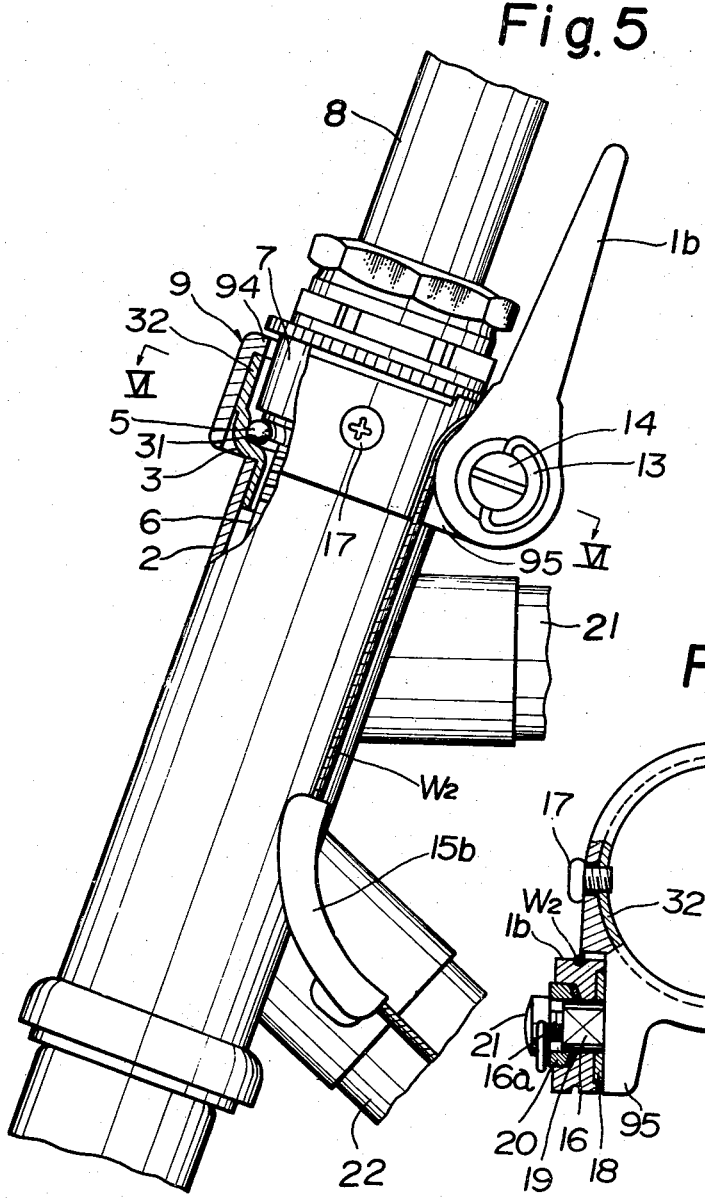
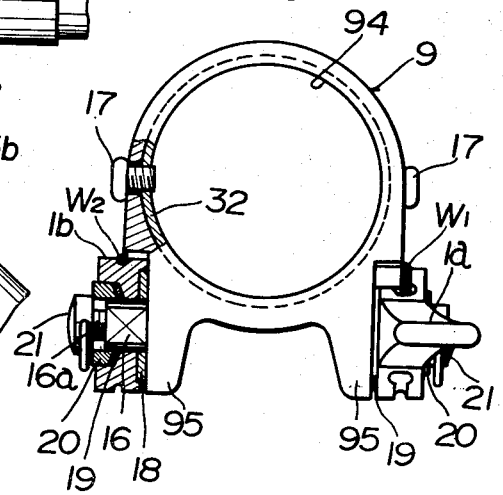

MECHANISM FOR MOUNTING A SPEED CONTROL LEVER TO A BICYCLE

This invention relates to a mechanism for mounting a speed control lever to a bicycle, and more particularly to a mechanism for mounting to a bicycle a speed control lever for operating a derailleur provided at the side of a rear wheel or chain wheel and crank.

Generally, the control lever is mounted to a handlebar, a handle stem, or a frame in the vicinity of the handlebar, e.g., a top tube. When a cyclist steers the bicycle while grasping the handlebar, it is easier to operate the control lever located at the handlebar or handle stem in comparison to the top tube because the former lever is positioned nearer the handle grip than the latter, whereby the interruption of looking forward is avoided providing a safer operation. However, the handlebar and handle stem, when steering the bicycle, must turn or rotate with respect to the bicycle frame carrying the derailleur.

Accordingly, when the control lever is attached to the handlebar or handle stem, a control wire, which connects the control lever and derailleur, requires an outer sheath so as not to be adversely affected by the turn or rotation of the handlebar or handle stem. Also, the control wire should be larger in length than the actual distance between the lever and the derailleur.

On the other hand, when the control lever is mounted to the top tube, the control wire is used without the necessity of the outer sheath and may be as short as possible. However, the control lever, which is attached to the top tube, is more remote from the handle grip than when attached to the handlebar or handle stem. Therefore, the cyclist keeps his hand apart from the handle grip for a while, and is interrupted from looking in a forward direction which presents a safety problem while running the bicycle.

In view of the aforesaid problems, this invention has been designed. An object of the invention is to provide a mounting mechanism which is capable of mounting the control lever at a position where the cyclist may facilitate lever control with safety while steering the bicycle and which is constructed simple without regard to the aforesaid problem raised when the control lever is mounted to the handlebar or handle stem.

The inventor has determined that a head pipe of the bicycle is positioned nearest the handle grip and stationary even when the handlebar is turned to steer the bicycle and that the head pipe is provided with a bearing member for rotatably supporting a fork stem of the bicycle, and designed to utilize the bearing member for mounting the control lever.

The invention is characterized in that a bearing member, which is fixed to the head pipe of the bicycle, is extended axially upwardly to form an extension, the extension carrying a support member for rotatably supporting the control lever.

In addition, the upper bearing member used in the invention is mostly cup-like shaped and generally called a top ball head cup. Besides this, the upper bearing member includes the so-called top cone. Also, the support member of the simplest construction is represented by a shaft, but may include a separate member having a shaft fixed to the bearing member.

These and other objects of the invention will be more apparent from description of an embodiment in accordance with the accompanying drawings, in which:

FIGS. 4 through 6 represent modified embodiments, in which FIG. 4 is a partially cutaway front view of a modified embodiment, FIG. 5 is a partially cutaway side view of another modified embodiment, and FIG. 6 is a partially cutaway plan view of a principal portion only of the embodiment in FIG. 5.

A mounting mechanism is shown which carries a control lever $1a$ for controlling a rear derailleur (not shown) provided at the side of a rear wheel of the bicycle and a control lever $1b$ for controlling a front derailleur at the side of a chain wheel and crank.

Incidentally, the invention need not mount two control levers to the mounting mechanism, as only one of the levers $1a$ and $1b$ may be mounted thereto.

Figure 2:
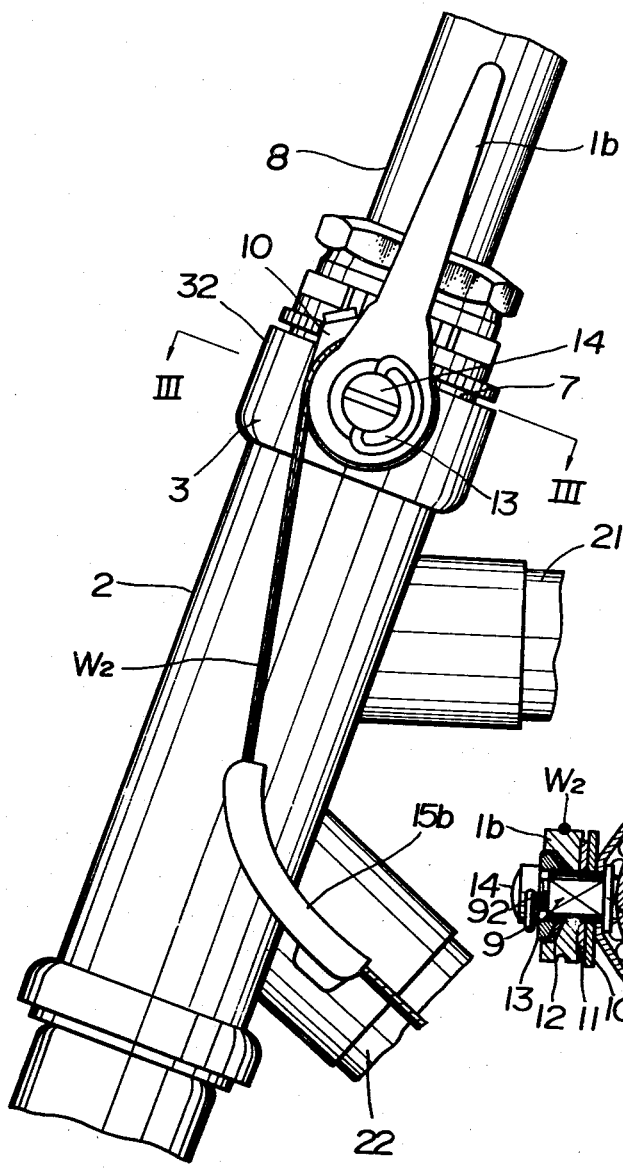
FIG. 2 is a partially cutaway side view thereof.

Referring to the drawings, reference numeral 2 designates a head pipe, a part of the bicycle frame. The head pipe 2 is positioned at the fore end of the frame and fixed to the foremost ends of a top tube 21 and down tube 22 as shown in FIG. 2. At both axially vertical ends of the head pipe 2 are fixed an upper bearing member 3 having a ball race 31 and a lower bearing member 4 having a ball race (not shown), so that the head pipe 2 supports a fork stem 6 rotatably through both bearing members 3 and 4 and ball 5 carried therewith.

The fork stem 6 has at its lower portion legs 62 and 63 bifurcated through a shoulder 61 and is inserted into the head pipe 2. At the upper end of the fork stem 6 is provided an upper bearing member 7 having a ball race 71 and at the lower portion a lower bearing member (not shown) having a ball race (not shown), and the balls 5 are inserted between each bearing member at the head pipe 2 and at the fork stem 6, thereby rotatably supporting the fork stem 6 with respect to the head pipe 2.

Reference numeral 8 designates a handle stem, which is inserted into the fork stem 6 and fixed thereto by an expander cone and expander bolt (not shown).

The aforesaid construction is well-known and not important to the invention.

Figure 1:
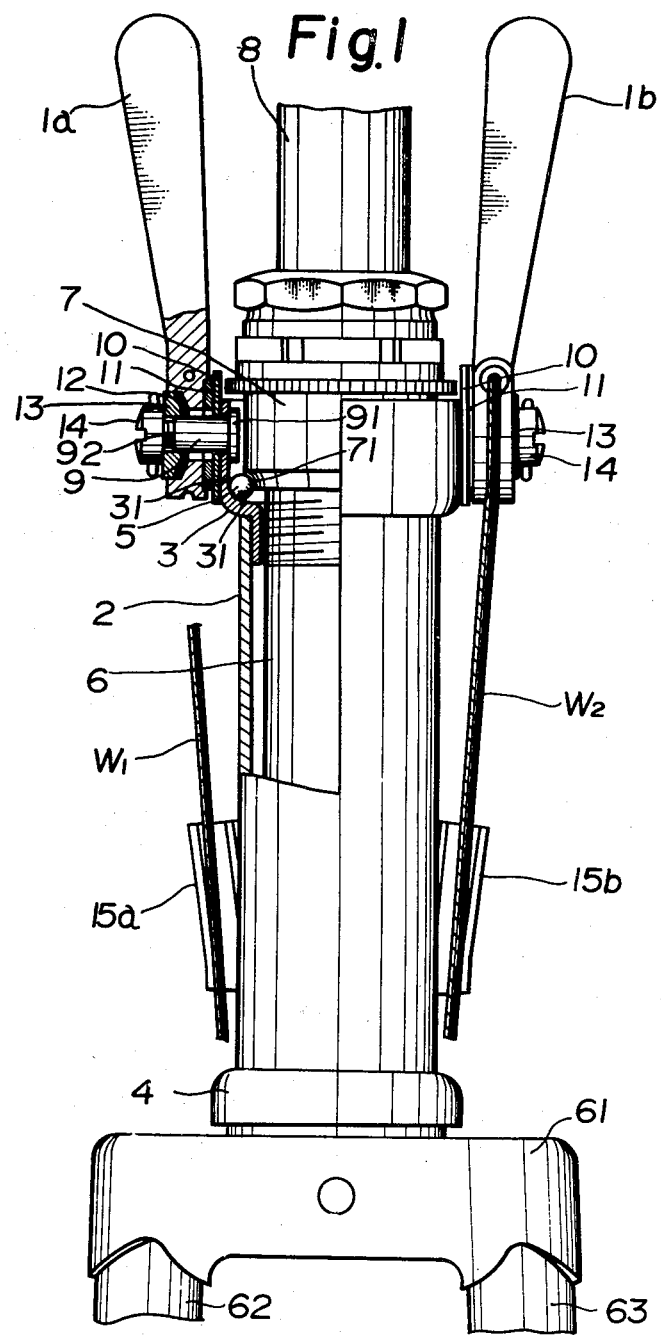
FIG. 1 is a partially cutaway front view of an embodiment of the invention.
Figure 3:
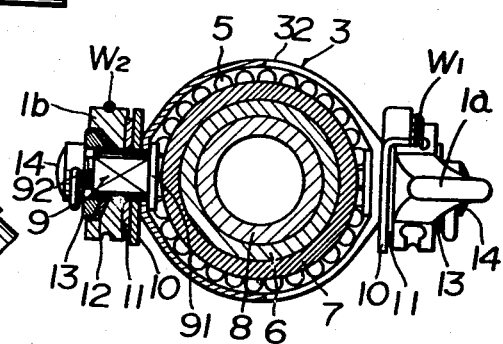
FIG. 3 is a sectional view taken on Line III—III in FIG. 2, looking from the direction of arrows.

In addition, the upper bearing member 3, which is provided at the upper portion of the head pipe 2, is cup-like shaped as shown in FIGS. 1 through 3. The cup-like shaped bearing member is provided at the bottom with the ball race 31 and is generally called the top ball head cup, but may be replaced by the so-called top cone.

In addition, when the top ball head cone is used for the upper bearing member 3, the top cone is used for the upper bearing member 7 at the fork stem 6, and vice versa.

The upper bearing member 3 at the head pipe 2 constructed to the foregoing is provided with an extension 32 extending upwardly from the ball race 31. The support members 9 for the control levers $1a$ and $1b$ are mounted to the extension 32, thereby supporting thereto levers $1a$ and $1b$ in a relationship where they may be freely turned.

The embodiment shown in FIGS. 1 to 3 will be detailed in the following description.

The embodiment employs a top ball head cup as the upper bearing member 3. The top ball head cup is extended axially upward at the upper edge thereof so as to form a cylindrical extension 32. Two shaft holes are formed diametrically opposite to each other at an intermediate portion of the extension 32, into which shafts having a round cross section are inserted.

The shafts serve as the aforesaid support members 9. Each of the shafts is headed 91 at one end thereof and threaded 92 at the other end, and is inserted into the extension 32 from the inside thereof so that the other end may project radially outward from the extension 32.

Also, the shafts support the control levers 1a and 1b as is well-known, which is understandable in the absence of a detailed description. Redundantly, the control levers 1a and 1b are inserted onto the shafts through patches 10 and washers 11 and are screwed with the threads 92 by use of nuts 14 through dish-like springs 12 and washers 13 respectively.

In the drawings, wire guides 15a and 15b are fixed to the head pipe 2 and control wires $W_1$ and $W_2$ are connected to the control levers 1a and 1b respectively.

As seen from the aforesaid embodiment, the control levers 1a and 1b, which are supported to the head pipe 2, are stationary at their mounting positions even when turning the handlebar, whereby the control wires $W_1$ and $W_2$ without outer sheaths are usable for transmitting the driving force from the levers 1a and 1b to the derailleurs respectively, resulting in an economical construction. The simple construction requiring that only shaft holes be provided to insertably mount therethrough the support member 9 comprising the shafts to the extension 32, requires no particular bracket or band for mounting the levers.

Figure 4:
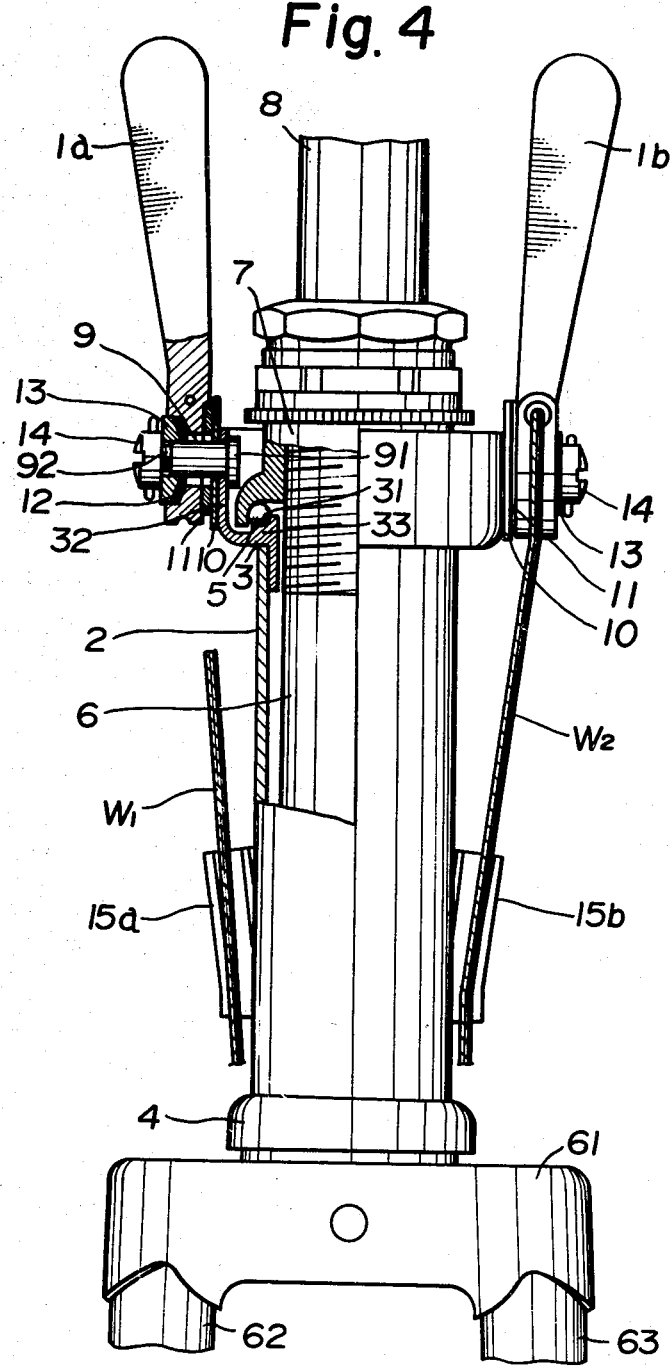

Referring to FIG. 4, the upper bearing member 3 employs a top cone. The top cone is substantially cylindrical-shaped, whose upper portion has a swollen portion 33, and the ball race 31 is provided at the outer periphery of the swollen portion 33. The swollen portion 33 is extended radially outward from the cone and then axially upwardly therefrom so as to form the aforesaid extension 32.

In addition, the support members 9 in FIG. 4 are formed of shafts the same as in FIG. 1, and the explanation of supporting the control levers 1a and 1b will be omitted here.

Another modified embodiment is shown in FIGS. 5 and 6, in which the top ball head cup is used for the upper bearing member 3, the same as in FIGS. 1 to 3, but the support member 9 to be mounted to the extension 32 is formed in a cylindrical body having an inner diameter larger than the outer diameter of the extension 32. To the cylindrical support member 9 is mounted shafts 16 which are threaded 16a at the tips thereof and fixed to the extension 32 by means of screws 17 respectively.

In addition, other than the aforesaid cylindrical body as shown in FIGS. 5 and 6, the support member 9 may be formed in a flat plate, but the cylindrical body is more strengthened in attachment to the extension 32.

The cylindrical support member 9 is provided at one axial end thereof with an inwardly projecting flange 94 and at one lateral side with flat holders 95 to which the shafts 16 are mounted preferably integrally with the holders.

In addition, the shafts 16 support the control levers 1a and 1b in a manner similar to the embodiment in FIGS. 1 to 3, namely, the control levers 1a and 1b are inserted onto the shafts 16 through washers 18 and supported to the shafts by means of nuts 21 screwed with the threads 16a through dish-like springs 19 and washers 20 respectively.

In the aforesaid description, the control levers 1a and 1b are supported to the upper bearing member 3. Also, the lower bearing 4 is similarly applicable for supporting the levers.

As clearly understood from the aforesaid description, the mounting mechanism of the invention is so constructed that the support members for the control levers are mounted to the extension of the bearing member fixed to the head pipe, whereby the control levers are mountable to the head pipe in a simple construction. Furthermore, the head pipe is stationary regardless of the handlebar turn, whereby the control wires connecting the control levers and derailleurs require no outer sheaths and are kept a minumum length sufficient to cover an actual distance between each lever and derailleur.

Accordingly, the needlessness of an outer sheath leads to a low cost production and improves the efficiency of transmitting the driving force from the control lever.

The support members, which are mounted to the extension of the bearing member, make mounting from the inside of the extension possible and soldering need not be applied even when the lever shafts are mounted directly to the extension for simplifying the mounting construction for the lever.

As many apparently different embodiments of the invention may be made without departing from the spirit and scope thereof, it is to be understood that the invention is not limited to the specific embodiments thereof except as defined in the appended claims.

What is claimed is:

1. A mounting mechanism for mounting a speed control lever to a bicycle, comprising a pair of bearing members which are fixed to a head pipe of the bicycle and supporting a fork stem rotatable therewith, and a support member which rotatably supports said speed control lever, at least one of said bearing members having a ball race carrying balls which bear said fork stem therewith and an extension extending from said ball race axially outward from said bearing member, said support member being supported to said extension so that said speed control lever is rotatably supported to said support member.

2. The mounting mechanism according to claim 1, wherein said bearing member is formed of a cup-like shaped body and has at the bottom thereof a ball race, said cup-like shaped body being extended axially upward at the edge thereof to form a cylindrical extension.

3. The mounting mechanism according to claim 1, wherein said one bearing member is formed of a cylindrical body and has a swollen portion, said swollen portion having at the outer periphery thereof a ball race and being provided with an extension, said extension extending radially outward from said swollen portion and further extending axially upward at the foremost end of said radially outward extended portion.

4. The mounting mechanism according to claim 1, wherein said support member is formed of a shaft round in cross section, said shaft being mounted to said extension at said one bearing member.

5. The mounting mechanism according to claim 1, wherein said support member is fixed to said extension of said bearing member and a shaft round in cross section is mounted to said support member.

6. The mounting mechanism according to claim 5, wherein said support member is formed of a cylindrical body having an inner diameter larger than an outer diameter of said extension which is extending cylindrically from said bearing member, said cylindrical body having a holder, said holder having a shaft so that said control lever may be supported rotatably therethrough.

7. The mounting mechanism according to claim 6, wherein said shaft is formed integrally with said cylindrical body at said holder.

* * * * *